United States Patent [19]

Kurokawa

[11] Patent Number: 4,930,155
[45] Date of Patent: May 29, 1990

[54] MULTIPLE REDIALING SYSTEM

[75] Inventor: Shunji Kurokawa, Zama, Japan

[73] Assignee: Ricoh Company, Ltd., Tokyo, Japan

[21] Appl. No.: 288,564

[22] Filed: Dec. 22, 1988

[30] Foreign Application Priority Data

Dec. 24, 1987 [JP] Japan ................... 62-328130

[51] Int. Cl.⁵ ........................... H04M 1/272
[52] U.S. Cl. ..................... 379/354; 379/355
[58] Field of Search ............ 379/354, 355, 356, 357, 379/358, 216

[56] References Cited

U.S. PATENT DOCUMENTS 4,709,387 11/1987 Masuda ....................... 379/354
4,720,849 1/1988 Tayama ..................... 379/355 X

OTHER PUBLICATIONS

"Diavox Courier 605", Urban Jansson et al, Ericsson Review No. 3, 1984.

Primary Examiner—James L. Dwyer
Attorney, Agent, or Firm—Oblon, Spivak, McClelland, Maier & Neustadt

[57] ABSTRACT

A redialing system for use in an apparatus, such as a telephone unit, connected to a telephone network includes a telephone number memory for storing up to a predetermined number of telephone numbers each time when input and a character display unit for displaying desired information, including a telephone number. Each time when a recall button is depressed, another telephone number is read out from the memory and displayed at the character display unit in a predetermined order. When a redial button is depressed with a desired telephone number displayed at the character display unit, a call is automatically placed to a station of that desired telephone number.

8 Claims, 6 Drawing Sheets

Fig. 1a

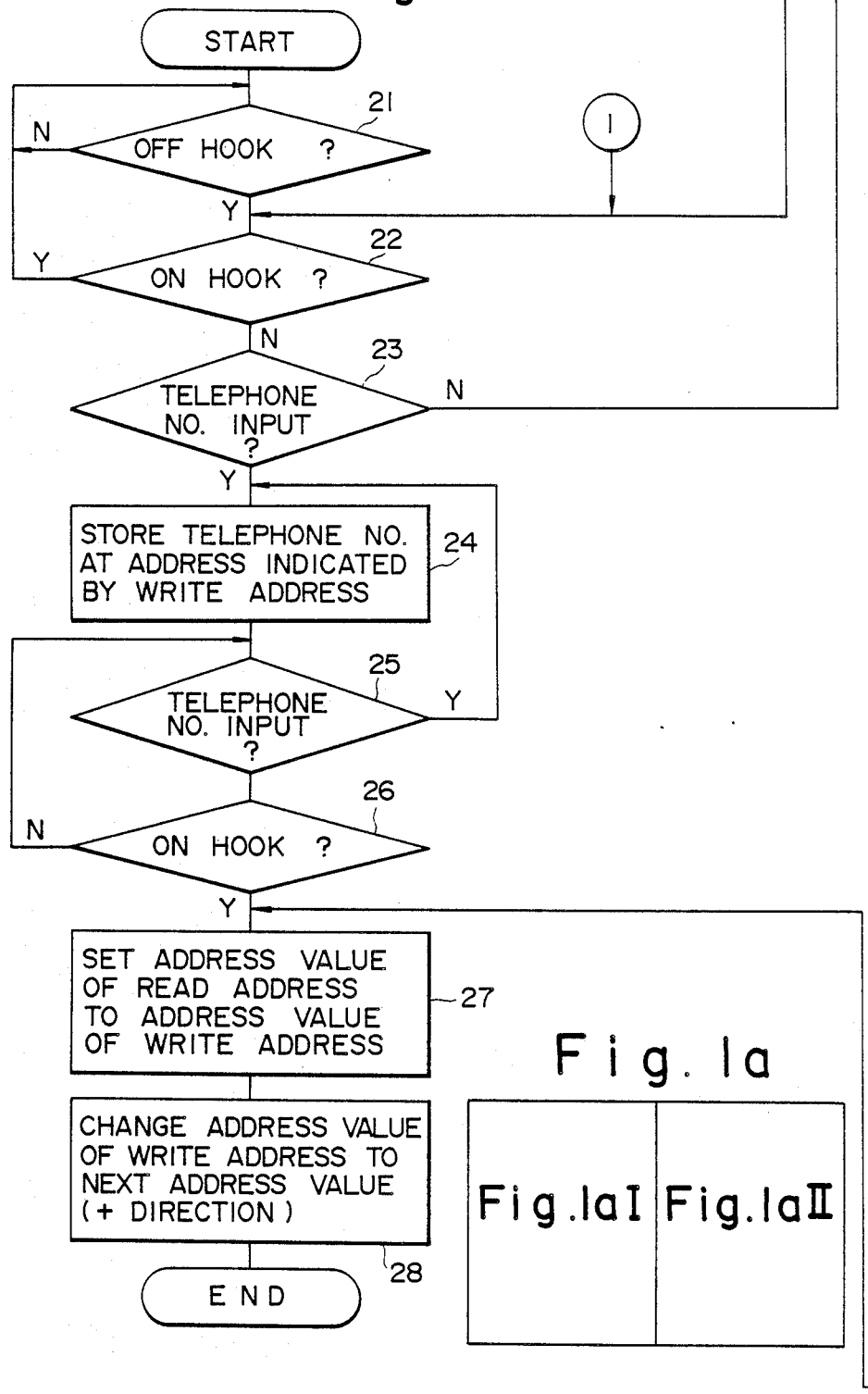

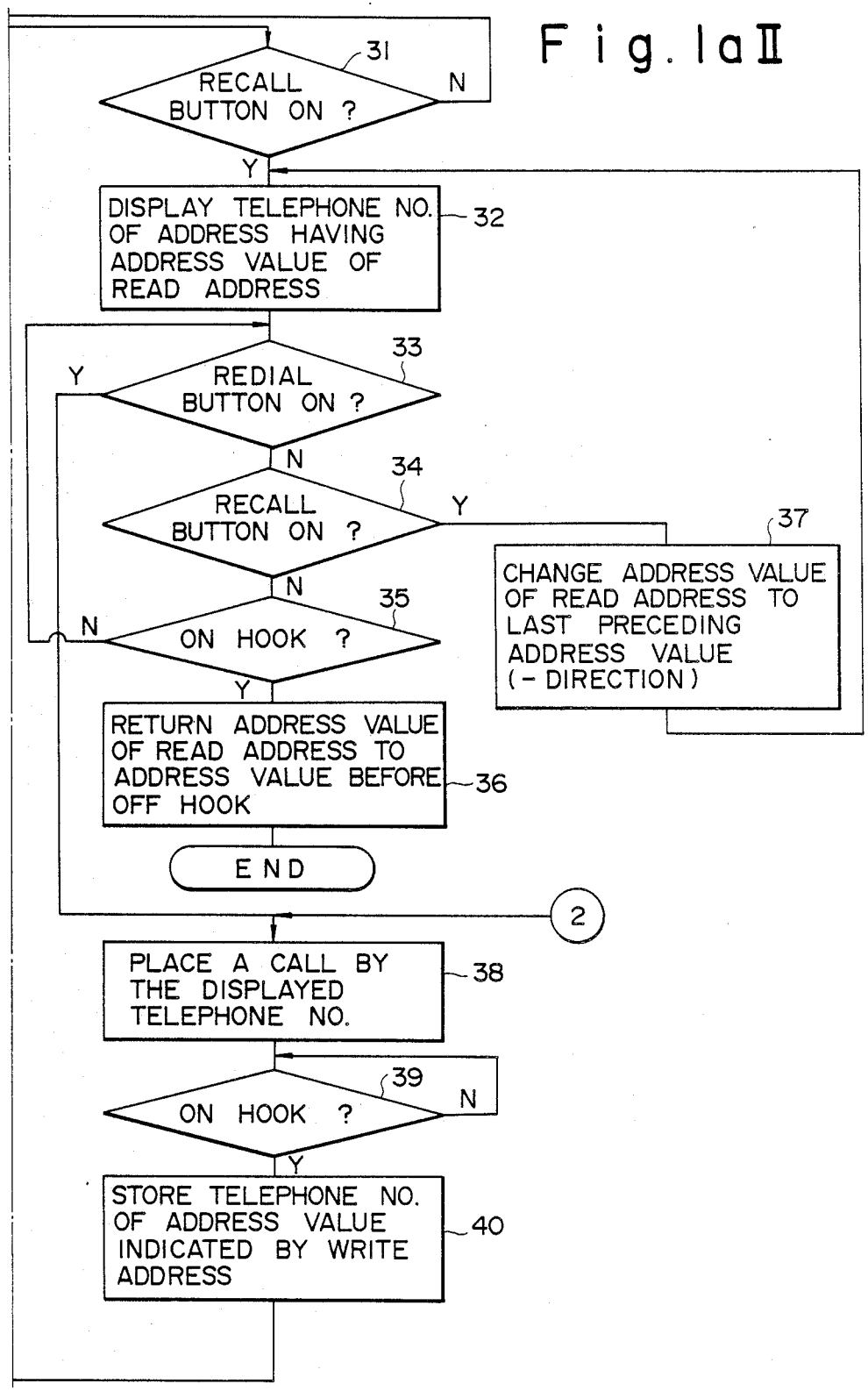
Fig. 1a II

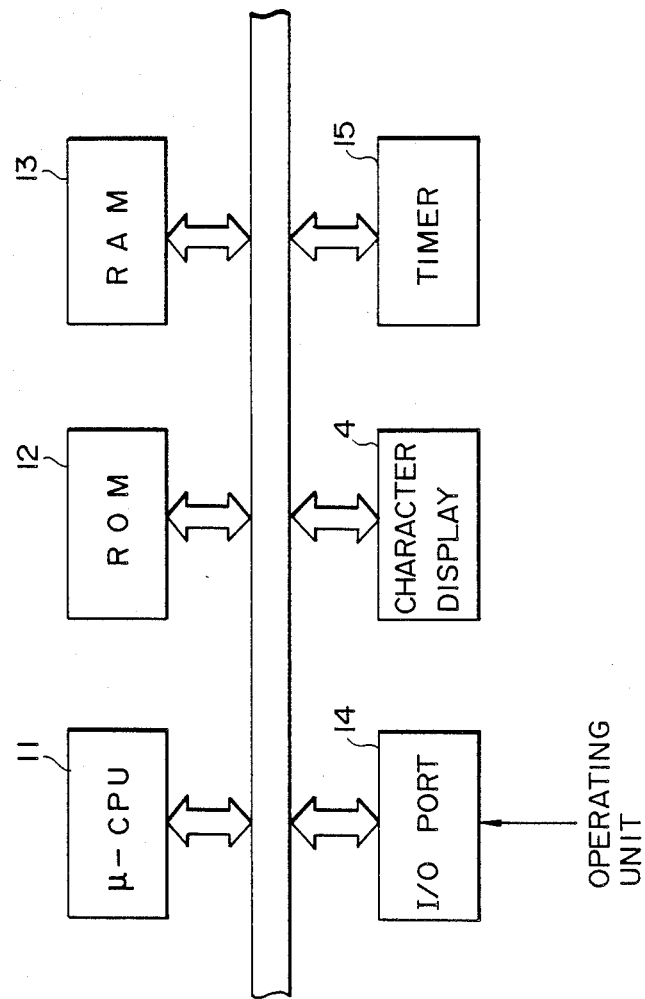

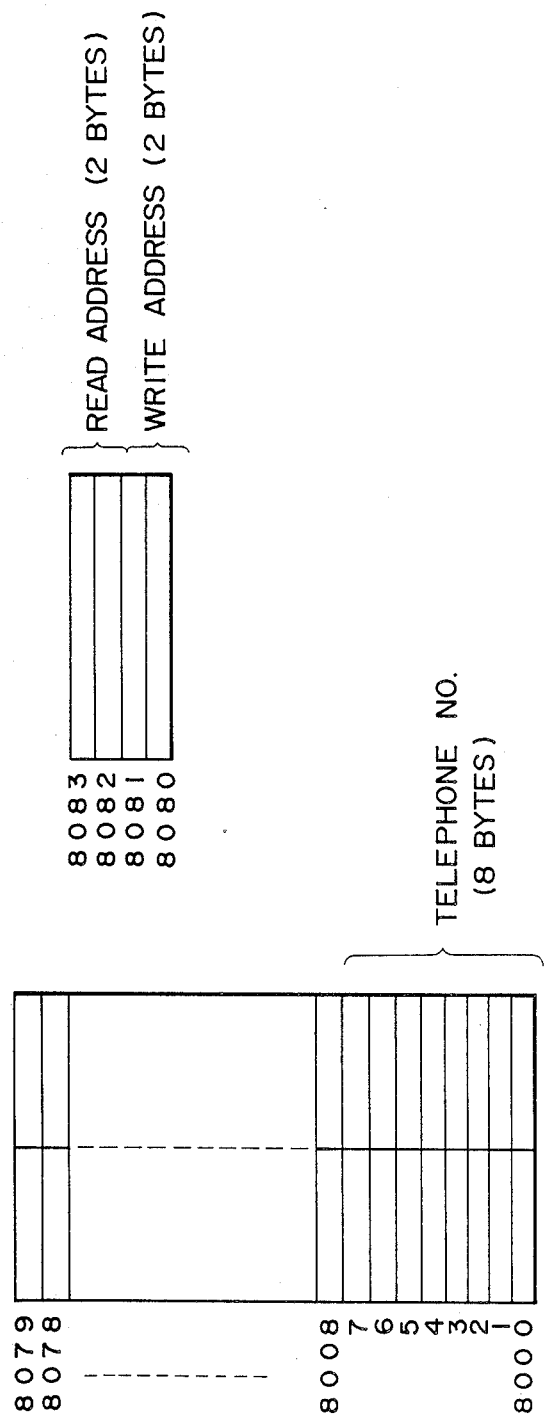

MULTIPLE REDIALING SYSTEM

BACKGROUND OF THE INVENTION

1. Field of the Invention

This invention generally relates to a redialing system for redialing an identification number of a destination station in a communication network, and, in particular, to a multiple redialing system of a telephone unit capable of selectively redialing a plurality of telephone numbers.

2. Description of the Prior Art

A redialing system of a telephone unit is well known in the art. In such a redialing system, the last dialed telephone number is stored if a connection to a destination station has not been successfully completed. In this case, without inputting the entire digits of the telephone number of a desired destination, the caller may send a call signal by simply depressing a redial button since the last dialed telephone number is stored However, in the prior art redialing system, it is so structured to store only the last dialed telephone number. Thus, if the caller placed a call to another station after an unsuccessful call to a desired station, the caller cannot use a redialing function to place a call to the desired station after calling the other station an thus the caller must input the entire telephone number of the desired station.

SUMMARY OF THE INVENTION

In accordance with the present invention, there is provided a redialing system for use in an apparatus connected to a telephone network, which comprises storing means for storing a plurality of telephone numbers and a display unit. A particular button is provided in the apparatus, and each time when the button is depressed, the next telephone number stored in the storing means is displayed on the display unit. With a desired telephone number displayed on the display unit, when a redial button provided in the apparatus is depressed, a call is automatically placed to a station of that telephone number.

It is therefore a primary object of the present invention to obviate the disadvantages of the prior art as described above and to provide an improved redialing system.

Another object of the present invention is to provide an improved redialing system for use in a communication apparatus which is connected to a telephone network in use.

A further object of the present invention is to provide an improved redialing system particularly suitable for use in a telephone unit.

A still further object of the present invention is to provide an improved redialing system of a telephone unit having an increased convenience in use.

Other objects, advantages and novel features of the present invention will become apparent from the following detailed description of the invention when considered in conjunction with the accompanying drawings.

BRIEF DESCRIPTION OF THE DRAWINGS

FIG. 1a is an illustration showing how to arrange FIGS. 1aI and 1aII;

FIGS. 1aI and 1aII, when arranged as shown in FIG. 1a, define a flow chart showing a sequence of steps of an operation of, the present redialing system;

FIG. 3 is a block diagram showing the overall structure of a control unit comprised of a microcomputer and provided in the telephone unit of FIG. 2; and FIG. 4 is an illustration showing one example of managing a memory for storing a plurality of telephone numbers in the control unit shown in FIG. 3.

DESCRIPTION OF THE PREFERRED EMBODIMENTS

Figure 2:
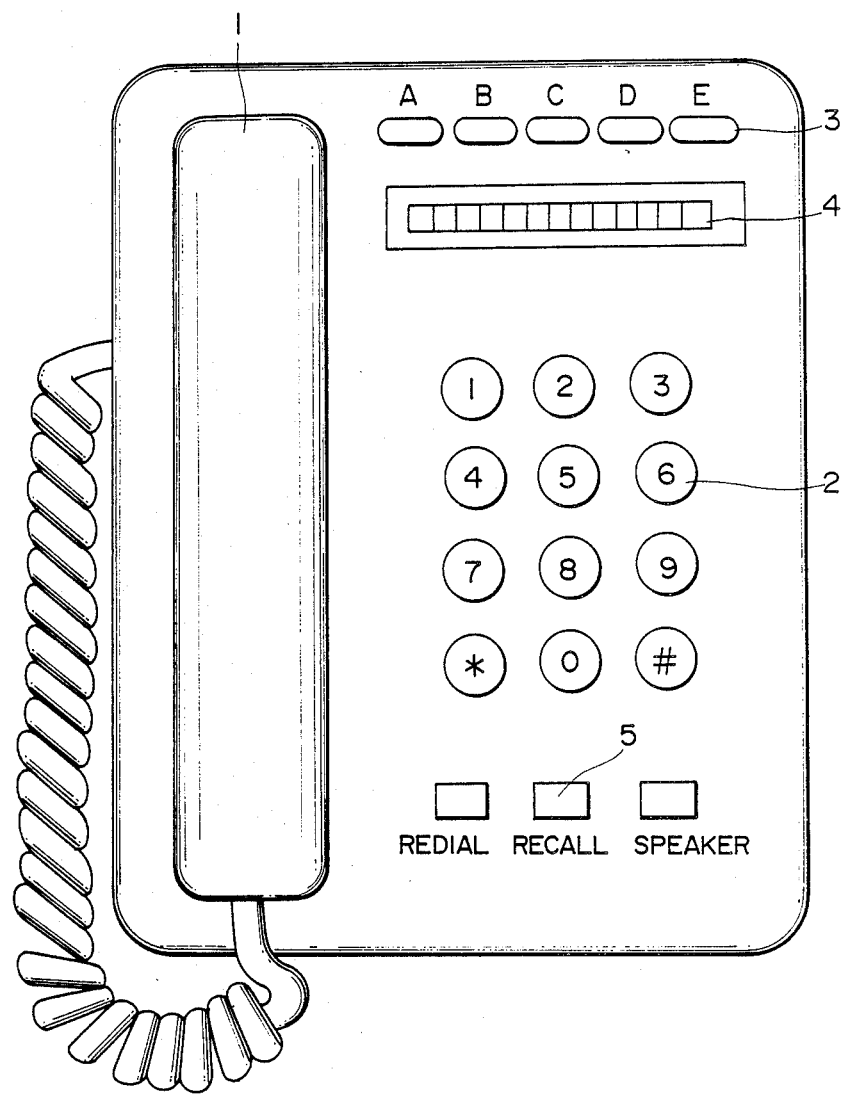
FIG. 2 is a schematic illustration showing a telephone unit constructed in accordance with one embodiment of the present invention.

Referring first to FIG. 2, there is schematically shown a telephone unit constructed in accordance with one embodiment of the present invention. As shown, the present telephone unit includes a handset 1, a plurality of dialing or numeric buttons 2, a plurality of function buttons 3, a character display unit 4 and a set of selection buttons 3, including redial, recall and speaker selection buttons As will be described in detail later, in the present telephone unit, every time when the recall button 5 is depressed, the next telephone number stored in the telephone unit in a particular order is displayed on the character display unit 4.

The present telephone unit includes a control unit shown in FIG. 3 and the illustrated control unit includes a microcomputer 11, a read only memory 12 for storing a predetermined program, a random access memory 13, an I/O port 14, and a timer 15. The I/O port 14 is operatively coupled to an operating unit, such as a control panel and the various buttons 2, 3 and 5 provided in the control panel. Thus, when any data is input into the telephone unit via depression of any of these buttons 2, 3 and 5, a command or data is supplied into the control unit via the I/O port 14. The memory for storing a plurality of telephone numbers for possible recalling later is defined in a portion of the RAM 13. As set forth above, a depression of the recall button 5 is recognized by the microcomputer 11 via the I/O port 14.

FIG. 4 illustrates an example of telephone memory management for storing telephone numbers each time when it has been input by depression of the numeric buttons 2 up to a predetermined number of telephone numbers and displaying the thus stored telephone numbers one at a time in a particular order each time when the recall button 5 is depressed. As shown in FIG. 4, the memory includes a write address which contains an address value indicating to which address, such as address 8000, address 8008, address 8016, etc. the current telephone number is to be written or stored. In the telephone number memory, 8 bytes are allocated to store one telephone number so that 16 bits are provided in the BCD format.

In operation, as shown in the flow chart of FIGS. 1aI and 1aII, when storing a plurality of telephone numbers, if the handset 1 is picked up (steps 21-22) and a telephone number is input (step 23), the telephone number thus input is stored into a particular address indicated by the write address shown in FIG. 4 (step 24). Then, if another telephone number is input (step 25), then the telephone number thus input is stored into another particular address currently indicated by the write address shown in FIG. 4 in a manner similar to the above (step 24).

When the handset 1 is returned to its position and thus set in its on-hook state (step 26) upon completion of inputting of telephone numbers, the address value in a read address shown in FIG. 4 is replaced by the address value of the telephone number which has just been input (step 27). On the other hand, every time when a telephone number has been input, the address value in the write address is altered to the next address value in a positive direction (step 28).

A read operation when a communication is to be carried out is carried out in the following manner. As shown in the flow chart of FIGS. 1aI and 1aII, every time when the handset 1 is picked up (steps 21-22) and the recall button 5 is depressed (steps 23, 31), the telephone number is read from the address having the address value corresponding to the address value of the read address and displayed at the character display unit 4 (step 32). And, the address value in the read address proceeds in a negative direction through steps 33, 34 and 37 in the flow chart, and, then, a similar operation is repeated when the recall button 5 is again depressed (step 34). Then, when the redial button 5 is depressed (step 33), a call is placed using the telephone number which is currently being displayed at the character display unit 4 (step 38). When the handset 1 is returned and set in its on-hook status (step 39), the current telephone number is stored in the address having the address value indicated by the write address to thereby complete the process (step 40).

In accordance with the present embodiment, even if a call has been placed to another station since the desired station was busy or somebody else has used the telephone unit, the present redialing function can still be used effectively. In particular, when the present invention is to be applied to a facsimile machine, such an application may be made without any alteration in hardware and simply by changes in software.

Figure 1B:
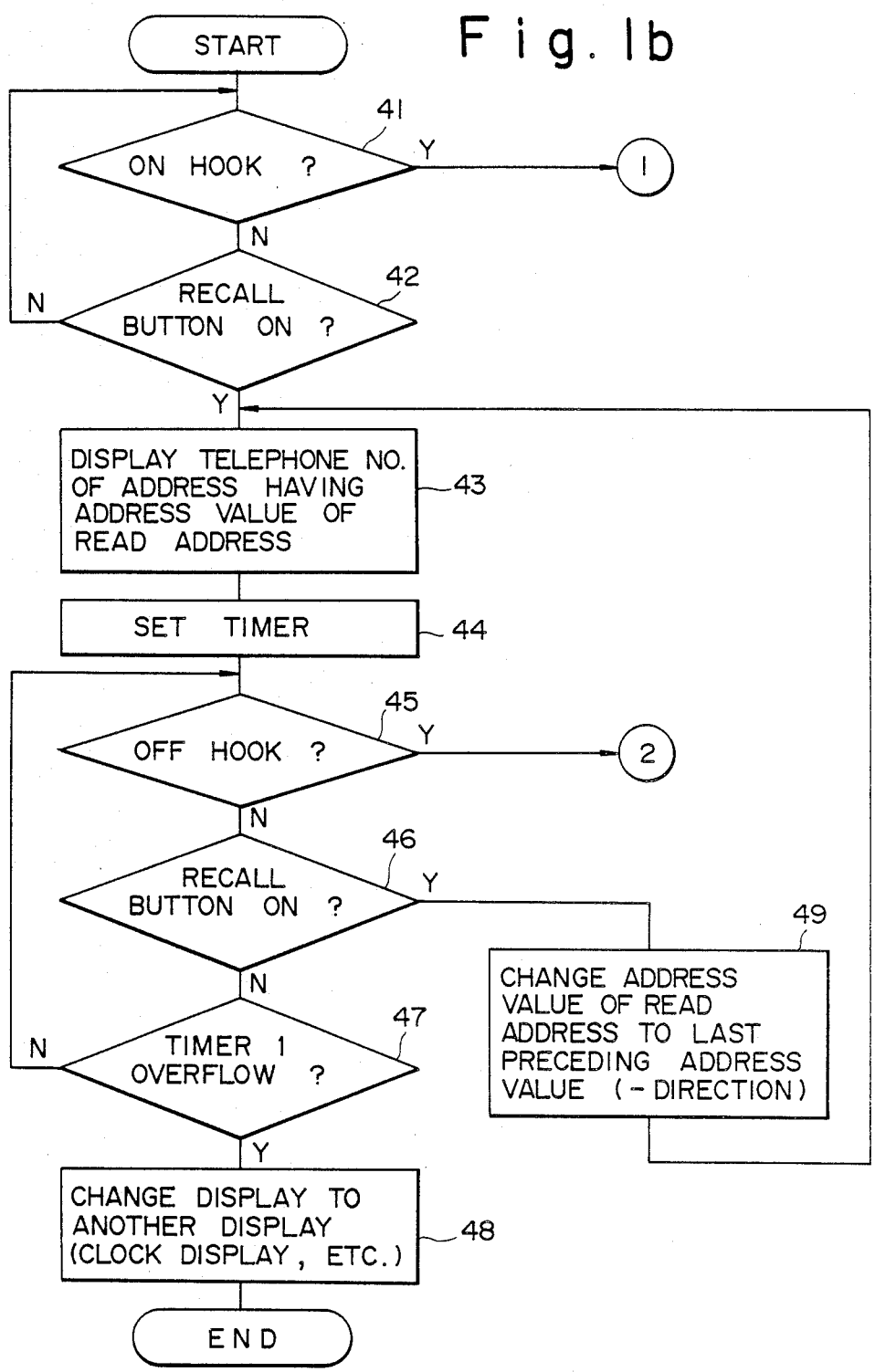
FIG. 1b shows a flow chart showing a sequence of steps of another operation of the present redialing system.

FIG. 1b illustrates a sequence of steps for searching for a desired telephone number by using the recall button 5 under the on-hook status and then placing a call upon off-hook (thus, without depression of the redial button 5). In accordance with this process, when the recall button 5 is depressed under the on-hook status (steps 41, 42), the telephone number is read out from the address having the address value corresponding to that of the read address and displayed at the character display unit 4 (step 43). Then, the timer 15 (see FIG. 3) is set at step 44, and, if there has been neither off-hook nor depression of the recall button 5 in a predetermined time period, the type of the information displayed (currently telephone number) is switched to another kind of information, such as date and/or time, (step 48) upon time over (steps 45-47). In accordance with this embodiment, the redialing function is cancelled automatically.

While the above provides a full and complete disclosure of the preferred embodiments of the present invention, various modifications, alternate constructions and equivalents ma be employed without departing from the true spirit and scope of the invention. Therefore, the above description and illustration should not be construed as limiting the scope of the invention, which is defined by the appended claims.

What is claimed is:

1. A radial system for use in a telephone unit having a handset and connected to a telephone network, comprising:
   a plurality of manual selection buttons for inputting a phone number;
   storing means for automatically storing the phone number in a memory immediately after the phone number is input, said memory having a capacity for storing a plurality of phone numbers;
   input means connecting said plurality of manual selection buttons to said storing means;
   retrieval means for retrieving the plurality of phone numbers located in the memory of said storing means on a last-in-first-out basis;
   display means for displaying a desired phone number retrieved by said retrieval means; and
   automatic call dialing means for automatically calling the desired phone number displayed on said display means when said handset is in an off-hook state.

2. A system according to claim 1, wherein:
   when the handset is picked up and the phone number is input, the telephone number thus input is stored into a particular address of said memory in said storing means.

3. A system according to claim 1, wherein:
   said retrieval means includes a recall button which, when depressed during a time that said handset is picked up, causes a telephone number stored in a read address of said memory of said storing means to be displayed on said display means.

4. A system according to claim 3, wherein:
   said automatic call dialing means includes a radial button which, when depressed when said handset is picked up, causes the telephone number stored in a read address of said memory and displayed on said display means to be automatically dialed.

5. A system according to claim 1, wherein:
   said retrieval means includes a recall button which, when depressed during a time when said handset is in an on-hook status, results in a telephone number stored in a read address of said memory and displayed on said display means to be dialed when said handset is picked up.

6. A system according to claim 1, wherein:
   said memory of said storing means includes a random access memory.

7. A system according to claim 6, further comprising:
   a timing means connected to said memory.

8. A system according to claim 1, wherein:
   said retrieval means includes a recall button;
   said automatic call dialing means includes a redial button; and
   said input means includes an input-output port connecting said retrieval means to said recall button, said redial button and said display means.

* * * * *